US012657640B2

(12) United States Patent
O'Brien

(10) Patent No.: US 12,657,640 B2
(45) Date of Patent: Jun. 16, 2026

(54) COMPUTERIZED NETWORK SYSTEM FOR CONDUCTING REMOTE, VIRTUAL MEDIATION PROCEEDINGS

(71) Applicant: Beatrice T. O'Brien, Short Hills, NJ (US)

(72) Inventor: Beatrice T. O'Brien, Short Hills, NJ (US)

(73) Assignee: BJUSTCOIN IP HOLDING LLC, Sheridan, WY (US)

( * ) Notice: Subject to any disclaimer, the term of this patent is extended or adjusted under 35 U.S.C. 154(b) by 277 days.

(21) Appl. No.: 17/106,694

(22) Filed: Nov. 30, 2020

(65) Prior Publication Data

US 2021/0082068 A1    Mar. 18, 2021

Related U.S. Application Data

(63) Continuation-in-part of application No. 16/244,720, filed on Jan. 10, 2019, now Pat. No. 11,232,403, which is a continuation-in-part of application No. 16/041,070, filed on Jul. 20, 2018, now Pat. No. 10,637,900.

(60) Provisional application No. 62/668,496, filed on May 8, 2018, provisional application No. 62/632,718, filed on Feb. 20, 2018, provisional application No. 62/629,354, filed on Feb. 12, 2018, provisional application No. 62/596,192, filed on Dec. 8, 2017.

(51) Int. Cl.
| | |
|---|---|
| *G06Q 50/18* | (2012.01) |
| *H04L 9/06* | (2006.01) |
| *H04L 9/32* | (2006.01) |
| *H04N 7/15* | (2006.01) |
| *H04L 9/00* | (2022.01) |

(52) U.S. Cl.
CPC ......... *G06Q 50/182* (2013.01); *H04L 9/0618* (2013.01); *H04L 9/3247* (2013.01); *H04N 7/152* (2013.01); *H04L 9/50* (2022.05)

(58) Field of Classification Search
CPC ................................................... G06Q 50/182
USPC .......................................................... 604/82
See application file for complete search history.

(56) References Cited

U.S. PATENT DOCUMENTS

| | | | |
|---|---|---|---|
| 7,249,114 B2 | 7/2007 | Burchetta et al. | |
| 7,251,607 B1 * | 7/2007 | Veschi ................... | G06Q 10/00 |
| | | | 705/309 |

(Continued)

OTHER PUBLICATIONS

Goodman, Joseph, "The Advantages and Disadvantages of Online Dispute Resolution: An Assessment of Cyber-Mediation Web Sites", Journal of Internet Law, vol. 9, No. 11, May 2006 (Year: 2006).*

(Continued)

*Primary Examiner* — John W Hayes
(74) *Attorney, Agent, or Firm* — Kevin Paganini, Esq.

(57) ABSTRACT

A computerized network system is configured to enable a mediator to conduct remote, virtual proceedings between two or more adverse parties. Each of the adverse parties participate in the proceedings through a Party App, while the mediator uses a Mediator App. A network connection connects the parties and the mediator to a system server and a system database. Virtual mediation proceedings are conducted in multiple virtual meeting rooms, and all non-private communications and documents are tracked by a blockchain process and stored in the system database.

5 Claims, 3 Drawing Sheets

(56)           References Cited

U.S. PATENT DOCUMENTS

|  |  |  |  |  |
|---|---|---|---|---|
| 7,529,679 | B1 | 5/2009 | Pomerance | |
| 11,270,300 | B1* | 3/2022 | Vijayaraghavan | ........................... G06Q 20/0655 |
| 2002/0007362 | A1 | 1/2002 | Collins et al. | |
| 2002/0035480 | A1* | 3/2002 | Gordon | ................... G06Q 30/02 705/309 |
| 2004/0030603 | A1* | 2/2004 | Grundfest | .......... G06Q 30/0601 705/26.1 |
| 2004/0138900 | A1* | 7/2004 | Read | ...................... G06Q 30/02 705/309 |
| 2006/0176365 | A1* | 8/2006 | Reisch | ................ H04L 12/1822 348/14.09 |
| 2008/0126266 | A1 | 5/2008 | Burchetta et al. | |
| 2010/0131328 | A1* | 5/2010 | DeLugas | .............. G06Q 50/188 705/40 |
| 2012/0198357 | A1* | 8/2012 | Tozzi | ................... G06Q 50/182 715/753 |
| 2013/0046700 | A1* | 2/2013 | Vilosny | .................. G06Q 50/18 705/309 |
| 2013/0144754 | A1* | 6/2013 | Moser | .................... G06Q 30/06 705/26.61 |
| 2013/0339256 | A1 | 12/2013 | Shroff | |
| 2014/0379589 | A1* | 12/2014 | Ratcliffe | .............. G06Q 50/182 705/309 |
| 2016/0027134 | A1* | 1/2016 | Alvarado | ........... H04L 12/1818 705/311 |
| 2017/0148118 | A1* | 5/2017 | Fuller | .................... G06Q 50/18 |
| 2019/0102848 | A1* | 4/2019 | Egenthal | ........... G06Q 20/0855 |
| 2020/0334772 | A1* | 10/2020 | Gorodeisky | .......... G06F 40/289 |
| 2021/0049717 | A1* | 2/2021 | Li | ......................... H04L 9/3247 |
| 2025/0126202 | A1* | 4/2025 | Nahamoo | ............... G06F 16/27 |

OTHER PUBLICATIONS

Sela, Ayelet, "Can Computers Be Fair? How Automated and Human-Powered Online Dispute Resolution Affect Procedural Justice in Mediation and Arbitration", Ohio State Journal on Dispute Resolution, vol. 33:1 2018 (Year: 2018).*

Allen et al, "The Governance of Blockchain Dispute Resolution", Harvard Negotiation Law Review, vol. 25:75 (Year: 2020).*

Hornle, Julia, "Online Dispute Resolution: The Emperor's New Clothes?", International Review of Law Computers & Technology, vol. 17, No. 1, pp. 27-37, 2003 (Year: 2003).*

Bastress, Robert et al., "Taking The Lawyer's Craft Into Virtual Space: Computer-Mediated Interviewing, Counseling, and Negotiating", Clinical Law Review, vol. 10:115, 2003 (Year: 2003).*

Hickey, Will, "Using Blockchain for Immutable Mediation and Autonomous Governance", Technology & Digital Governance, Harvardkennedyschoolreview.com, vol. 19, pp. 143-147, 2019 (Year: 2019).*

Protopsaltou, Dimitris et al., "Taking the Fourth Party Further? Considering a Shared Virtual Workspace for Arbitration", Information & Communications Technology Law, vol. 15, No. 2, Jun. 2006 (Year: 2006).*

* cited by examiner

COMPUTERIZED NETWORK SYSTEM FOR CONDUCTING REMOTE, VIRTUAL MEDIATION PROCEEDINGS

REFERENCE TO RELATED APPLICATIONS

This application is a continuation-in-part of U.S. Non-Provisional application Ser. No. 16/244,720 (filed Jan. 10, 2019), which is a continuation-in-part of U.S. Non-Provisional application Ser. No. 16/041,070 (filed Jul. 20, 2018), which claims the benefit of the filing dates of U. S. Provisional Applications Nos. 62/596,192 (filed Dec. 8, 2017), 62/629,354 (filed Feb. 12, 2018), 62/632,718 (filed Feb. 20, 2018), and 62/668,496 (filed May 8, 2018), the disclosures of all of which are incorporated herein by reference.

FIELD OF INVENTION

The present invention relates to the general field of virtual dispute resolution systems, and more particularly to virtual mediation proceedings conducted over a computerized network system.

BACKGROUND OF THE INVENTION

Mediation is a process by which legal disputes are resolved without resort to trial type evidentiary hearings. Unlike a judicial judge, a mediator does not have the power to render a binding decision on the dispute. Instead, the mediator facilitates settlement negotiations between the parties by conducting a series of conferences with the parties jointly and separately to formulate and discuss settlement proposals.

Although the application of remote video conferencing software to conduct dispute resolution is known in the prior art, there remains a need for a comprehensive network system which applies blockchain technology to generate an immutable record of virtual joint conferences, and which implements the formulation and execution of settlement agreements.

SUMMARY OF THE INVENTION

The present invention is a computerized network system for conducting a remote, virtual proceedings conducted by a mediator to resolve a dispute between two or more adverse parties. The network system comprises the network system software, which comprises a system database, a server software, a downloadable native Party App, for use by the adverse parties, a downloadable Attorney App, for use by adverse attorneys who represent the adverse parties, and a web-based Mediation App for use by the mediator in conducting the mediation proceeding. The Party App and the Attorney App both link to the Mediation App.

The network system further comprises the system hardware, which comprises party pc devices, used by the adverse parties, attorney pc devices, used by the adverse attorneys, and mediator pc devices, used by the mediator. The party pc devices run the Party App linked to the Mediation App, the attorney pc devices run the Attorney App linked to the Mediation App, and the mediator pc devices run the Mediation App.

The system server runs the server software, and the system hardware is interconnected through a network connection, which can be the internet or a cloud. The Mediation App identifies each mediation proceeding by a unique alpha-numerical case number and assigns a sequential session number to each mediation session of the mediation proceeding.

The Mediation App configures multiple virtual mediation rooms, comprising a Mediator's Room, assigned to the mediator, and multiple Party Rooms, assigned to each of the adverse parties and their adverse attorneys. The Mediation App enables the mediator to schedule the mediation session and to invite the adverse parties and their respective attorneys to participate in the mediation session, through the Party App and the Attorney App, by signing into the Mediation App through the system server, using the case number and the session number.

The Mediation App includes a video-conferencing software, which enables the mediator to conduct virtual joint conferences with the adverse parties and their attorneys in the Mediator's Room and to conduct virtual private conferences with one of the adverse parties and their attorneys in the assigned Party Room. The video-conferencing software also enables real-time sharing of multiple mediation documents between and among the adverse parties and the mediator, as well as real-time drafting and editing of the mediation documents by the adverse parties, their attorneys and/or the mediator.

The network system software is configured to implement a blockchain process, which generates an immutable record of the mediation documents and of the virtual joint conferences conducted by the mediator, and which stores the immutable record in the system database.

The Mediation App is configured to enable the mediator to elicit and receive from the adverse parties and their attorneys verbal consent authorizing the mediator to present a settlement initiative to other adverse parties. The blockchain process tracks and stores each such verbal consent in the system database. The Mediation App is also configured to enable the adverse parties to electronically sign final versions of the mediation documents and to enable electronic attestations thereof by the mediator.

In the course of one of the virtual joint conferences, the video conferencing software enables one of the participating adverse parties and their attorneys to conduct private discussions among themselves and/or with one or more other parties and/or with the mediator. These private discussions are excluded from the immutable record generated by the blockchain process.

The foregoing summarizes the general design features of the present invention. In the following sections, specific embodiments of the present invention will be described in some detail. These specific embodiments are intended to demonstrate the feasibility of implementing the present invention in accordance with the general design features discussed above. Therefore, the detailed descriptions of these embodiments are offered for illustrative and exemplary purposes only, and they are not intended to limit the scope either of the foregoing summary description or of the claims which follow.

DETAILED DESCRIPTION OF THE PREFERRED EMBODIMENT

Figure 1:
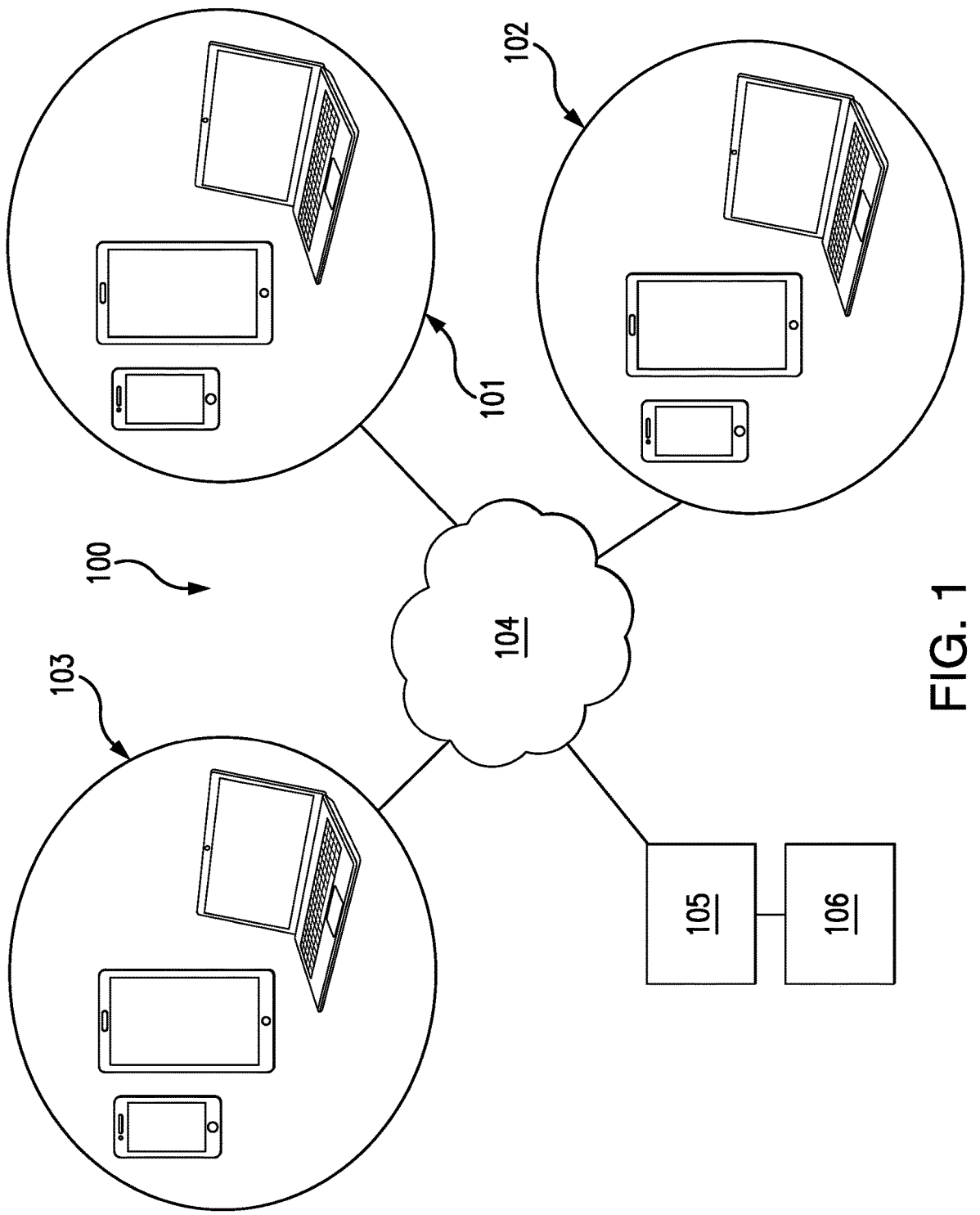
FIG. 1 is a schematic diagram of an exemplary network system, according to the illustrated embodiment of the present invention.
Figure 2:
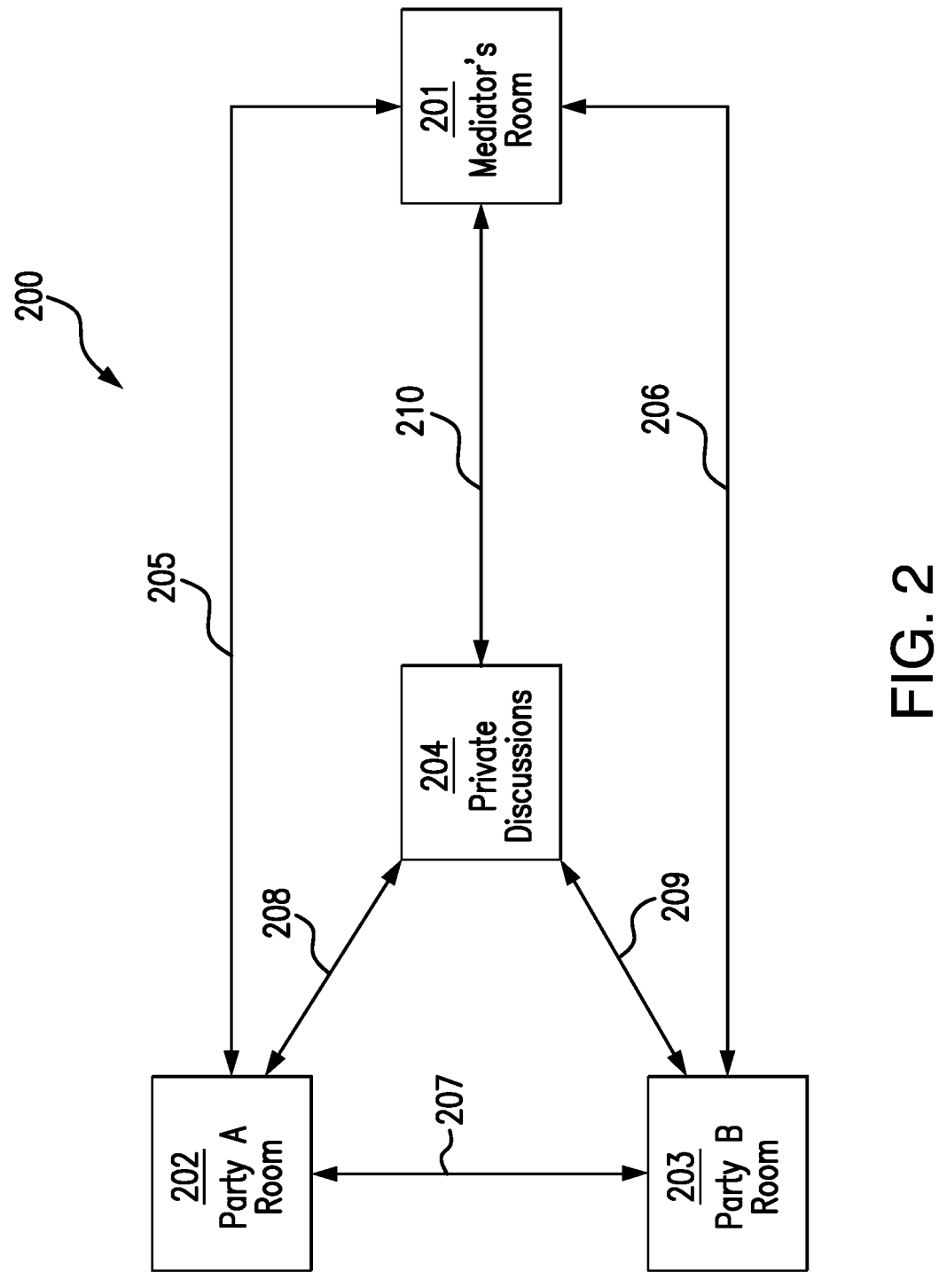
FIG. 2 is a schematic diagram of multiple exemplary virtual mediation rooms, according to the illustrated embodiment of the present invention.

Referring to FIG. 2, the network architecture 100 for the exemplary embodiment of the present invention, in which there are two adverse parties, designated as Party A and Party B. The respective pc devices of Party A 101, Party B 102 and the mediator 103 are interconnected through a network connection 104 to the system server 105 and the system database 106. The network connection 104 can be through the internet or a cloud.

Referring to FIG. 2, an example is shown of four virtual mediation rooms 200 configured by the Mediation App. In the Mediator's Room 201, the mediator conducts the virtual joint conferences, attended by all adverse parties and their attorneys. In this exemplary configuration 200, Party A 202 and Party B 203 participate in joint conferences through their respective links 205 206 to the Mediator's Room 201.

In Party A Room 202, the mediator conducts virtual private conferences with Party A through the two-way link 205. In Party B Room 203, the mediator conducts virtual private conferences with Party B through the two-way link 206. Private communications between the two parties 202 203 are through the two-way link between their rooms 207.

In the course of a virtual joint conference conducted by the mediator in the Mediator's Room 201, either or both of the parties 202 203 and/or the mediator can conduct private discussions in the Private Discussion Room 204, through their respective two-way links 208 209 210.

All joint conferences and their associated documents are tracked by the system's blockchain process and stored in the system database 106. All private conferences and private discussions are off-the-record and are not tracked by the blockchain process.

Figure 3:
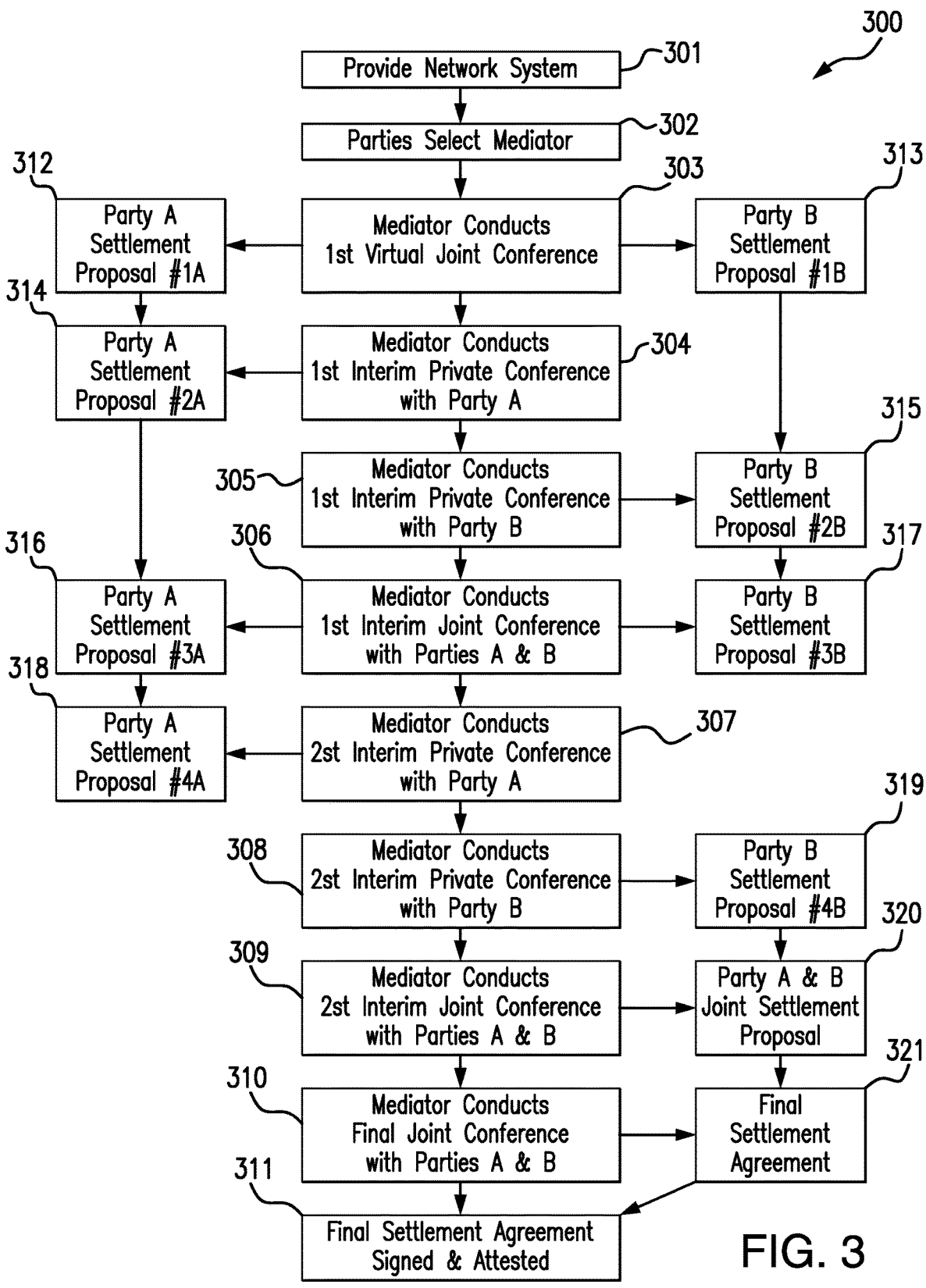
FIG. 3 is a flowchart of an exemplary remote, virtual mediation proceeding, according to the illustrated embodiment of the present invention.

Referring to FIG. 3, the exemplary method of conducting the remote, virtual mediation proceeding 300 is illustrated. After the network is activated 301, the parties select the mediator 302, who then conducts the first virtual joint conference 303, in which Party A and Party B and their respective attorneys participate. At this initial joint conference, the parties present their initial positions regarding settlement of the dispute and each party formulates a first settlement proposal 312 313.

The mediator then conducts a first interim private conference with each of the parties 304 305, in which they discuss modifications to their respective first settlement proposals 312 313 and formulate second settlement proposals 314 315, which move closer toward an agreement. The mediator next conducts a virtual first interim joint conference 306, in which Party A and Party B and their respective attorneys participate. The parties discuss modifications to their respective second settlement proposals 314 315, and formulate third settlement proposals 316 317 which move closer toward an agreement.

The mediator then conducts a second round of interim private conferences with each of the parties 307 308, in which they discuss modifications to their respective third settlement proposals 316 317 and formulate fourth settlement proposals 318 319, which move closer toward an agreement. The mediator next conducts a virtual second interim joint conference 309, in which Party A and Party B and their respective attorneys participate. The parties discuss modifications to their respective fourth settlement proposals 318 319 and, with the guidance of the mediator, arrive at a joint settlement proposal 320, which becomes the basis of a final settlement agreement.

Finally, the mediator convenes a final joint conference 310, in which both parties and their attorneys participate. At this stage, the joint settlement proposal 320 is reduced to a final settlement agreement 321 which is signed by both parties and attested by the mediator 311.

It should be understood that, while the exemplary embodiment discussed above describes a number of rounds of virtual joint and private conferences, this number may vary from case to case, depending on the circumstances and the complexity of the dispute. It should also be understood that the various settlement proposals from each party are issued based on the consent of issuing party, and that all such consents are tracked by the system's blockchain process and stored in the system database.

Although the preferred embodiment of the present invention has been disclosed for illustrative purposes, those skilled in the art will appreciate that many additions, modifications and substitutions are possible, without departing from the scope and spirit of the present invention as defined by the accompanying claims.

What is claimed is:

1. A computerized network system for conducting a remote, virtual mediation proceeding conducted by a mediator to resolve a dispute between two or more adverse parties, the network system comprising:

a network system software, comprising a system database, a server software, a downloadable native Party App, for use by the adverse parties, a downloadable Attorney App, for use by adverse attorneys who represent the adverse parties, and a web-based Mediation App, for use by the mediator in conducting the mediation proceeding, and wherein the Party App and the Attorney App link to the Mediation App;

system hardware, comprising party pc devices, used by the adverse parties, attorney pc devices, used by the adverse attorneys, mediator pc devices, used by the mediator, and a system server, wherein the party pc devices run the Party App linked to the Mediation App, the attorney pc devices run the Attorney App with a link to the Mediation App, the mediator pc devices run the Mediation App, and the system server runs the server software, and wherein the system hardware is interconnected through a network connection;

wherein the Mediation App identifies the mediation proceeding by a unique alpha-numerical case number and assigns a sequential session number to a mediation session of the mediation proceeding;

wherein the Mediation App configures multiple virtual mediation rooms, comprising a Mediator's Room, assigned to the mediator, and multiple Party Rooms, assigned to each of the adverse parties and their adverse attorneys;

wherein the Mediation App is configured to enable the mediator to schedule the mediation session and to invite the adverse parties and the adverse attorneys to participate in the mediation session, through the Party App and the Attorney App, by signing into the Mediation App through the system server, using the case number and the sequential session number;

wherein the Mediation App assigns one of the Party Rooms to each of the adverse parties and their adverse attorneys; and wherein the Mediation App includes a video-conferencing software, which is configured to enable the mediator to conduct one or more virtual joint conferences with two or more of the adverse parties and their adverse attorneys in the Mediator's Room, and which is configured to enable the mediator to conduct one or more virtual private conferences with one of the adverse parties and their adverse attorneys in the Party Room assigned to said adverse party;

wherein the video-conferencing software is configured to enable real-time sharing of multiple mediation documents between and among the adverse parties, the adverse attorneys and the mediator, and is configured to enable real-time drafting and editing of the mediation documents by the adverse parties, the adverse attorneys and/or the mediator;

wherein the network system software is configured to implement a blockchain process, which generates an immutable record of the mediation documents and of the virtual joint conferences conducted by the mediator, and which stores the immutable record in the system database; and wherein the video-conferencing software, in the course of one of the virtual joint conferences, is configured to enable any of the adverse parties and their adverse attorneys to conduct private discussions among themselves and/or with one or more other of the adverse parties and their adverse attorneys and/or with the mediator, and wherein the immutable record generated by the blockchain process excludes the private discussions.

2. The computerized network system according to claim 1, wherein the Mediation App is configured to enable the mediator to elicit and receive from one or more of the adverse parties and their adverse attorneys a verbal consent authorizing the mediator to present a settlement initiative to other adverse parties and their adverse attorneys, and wherein the blockchain process tracks and stores each verbal consent in the system database.

3. The computerized network system according to claim 2, wherein the Mediation App is configured to enable the adverse parties to electronically sign final versions of the mediation documents, and to enable the mediator to electronically attest electronic signatures of the adverse parties.

4. A method of conducting the remote, virtual mediation proceeding to resolve the dispute between the two or more adverse parties, the method comprising the following steps:

(a) providing the computerized network system according to claim 1;

(b) selection by the adverse parties of the mediator;

(c) the mediator using the video-conferencing software to conduct a first virtual joint conference, in which all of the adverse parties and adverse attorneys participate, and in which each adverse party shares an initial position document that sets forth a settlement proposal of said adverse party;

(d) the mediator using the video-conferencing software to conduct a series of interim virtual private conferences with each of the adverse parties, in which interim virtual private conferences the mediator and the adverse parties and their adverse attorneys discuss modifications to the settlement proposals toward reaching a mutually acceptable settlement agreement;

(e) the mediator using the video-conferencing software to conduct a series of interim virtual joint conferences, in which some or all of the adverse parties and adverse attorneys participate in discussions of modifications to the settlement proposals toward reaching the mutually acceptable settlement agreement; and (f) the mediator using the video-conferencing software and the network system software to conduct a final virtual joint conference, in which all of the adverse parties and adverse attorneys participate, and in which the settlement agreement is reduced to a final settlement document, which is electronically signed by all the adverse parties and electronically attested by the mediator.

5. A system for conducting a remote virtual mediation proceeding comprising:

network system software that includes: a mediation app for use by a mediator during a virtual mediation proceeding; a party app for use by adverse parties during the virtual mediation proceeding; an attorney app for use by attorneys during the virtual mediation proceeding; and system hardware comprising: a server configured to execute the mediation app; party devices that execute the party app; attorney devices that execute the attorney app;

wherein:

the server, the party devices, and the attorney devices are interconnected through a network connection;

the mediation app configures multiple virtual mediation rooms comprising a virtual mediator room assigned to the mediator and multiple virtual party rooms, each of which is assigned an adverse party and one or more attorney associated with the adverse party;

the mediation app permits the mediator to establish a virtual mediation session that enables the adverse parties and the adverse attorneys to participate in the virtual mediation session through the party app and the attorney app;

the mediation app is configured to assign a first one of the adverse parties and their attorneys to a first virtual party room;

the mediation app is configured to assign a second one of the adverse parties and their attorneys to a second virtual party room;

the mediation app includes video-conferencing software, which enables the mediator to conduct one or more virtual joint conferences with the adverse parties and their attorneys in the virtual mediator room, and enables the mediator to conduct one or more virtual private conferences with one of the adverse parties and their attorneys in one of the virtual party rooms;

wherein the mediation app identifies the virtual mediation proceeding by a unique alpha-numerical case number and assigns a sequential session number to the virtual mediation session of the virtual mediation proceeding;

the network system software is configured to implement a blockchain process, which generates an immutable record for the virtual joint conferences conducted by the mediator; and wherein the video-conferencing software, in the course of one of the virtual joint conferences, is configured to enable any of the adverse parties and their adverse attorneys to conduct private discussions among themselves and/or with one or more other of the adverse parties and their adverse attorneys and/or with the mediator, and wherein the immutable record generated by the blockchain process excludes the private discussions.

* * * * *